(12) United States Patent
Ebata

(10) Patent No.: US 7,274,113 B2
(45) Date of Patent: Sep. 25, 2007

(54) POWER SUPPLY CIRCUIT AND ELECTRONIC DEVICE

(75) Inventor: Kazuyoshi Ebata, Tokyo (JP)

(73) Assignee: Sony Corporation, Tokyo (JP)

( * ) Notice: Subject to any disclaimer, the term of this patent is extended or adjusted under 35 U.S.C. 154(b) by 99 days.

(21) Appl. No.: 11/206,021

(22) Filed: Aug. 18, 2005

(65) Prior Publication Data

US 2006/0050460 A1    Mar. 9, 2006

(30) Foreign Application Priority Data

Sep. 3, 2004 (JP) ............................. 2004-257246
Jul. 7, 2005 (JP) ............................. 2005-199049

(51) Int. Cl.
*H02J 7/00* (2006.01)

(52) U.S. Cl. ........................................ 307/64
(58) Field of Classification Search .................. 307/64, 307/65, 66, 46, 48; 363/65, 67
See application file for complete search history.

(56) References Cited

U.S. PATENT DOCUMENTS 5,861,736 A * 1/1999 Corsi et al. ................. 323/273

FOREIGN PATENT DOCUMENTS

| JP | 02-307109 | 12/1990 |
|---|---|---|
| JP | 08-095649 | 4/1996 |
| JP | 11-175203 | 7/1999 |

* cited by examiner

*Primary Examiner*—Adolf Berhane
(74) *Attorney, Agent, or Firm*—Oblon, Spivak, McClelland, Maier & Neustadt, P.C.

(57) ABSTRACT

A power supply circuit, wherein a power supply in a backup system is operational effectively even when a normal power supply to be used at a normal operation is turned off, including an A power supply system for supplying a first voltage to a circuit unit at a normal operation and a backup B power supply system, which starts to operate instantly when the A power supply system becomes abnormal to supply the first voltage to the circuit unit; wherein the B power supply system includes a regulator for outputting a second voltage equivalent to the first voltage, and a feedback circuit for detecting a voltage to be applied to the circuit unit and feeding back the detected voltage to the regulator; and the regulator adjusts an output voltage thereof, so that the voltage to be applied to the circuit unit becomes the first voltage when the voltage detected by the feedback circuit is lower than the first voltage.

4 Claims, 8 Drawing Sheets

POWER SUPPLY CIRCUIT AND ELECTRONIC DEVICE

CROSS REFERENCES TO RELATED APPLICATIONS

The present invention contains subject matter related to Japanese Patent Application JP 2004-257246 filed in the Japanese Patent Office on Sep. 3, 2004, and Japanese Patent Application JP 2005-199049 filed in the Japanese Patent Office on Jul. 7, 2005, the entire contents of which being incorporated herein by reference.

BACKGROUND OF THE INVENTION

1. Field of the Invention

The present invention relates to a power supply circuit and an electronic device supplied with power from the power supply circuit, and particularly relates to a power supply circuit provided with a backup system and an electronic device supplied with a power from the power supply circuit.

2. Description of the Related Art

In an electronic device (electronic equipment), such as a digital equipment, when the power is turned off (cutoff) and a voltage of a power supply and a current become unstable or when a power cannot be normally supplied, for example, due to an instant voltage down (temporary blackout), etc., the problems described below may occur.

(1) When the power supply voltage becomes low and an operation voltage of electronic device components becomes insufficient, the electronic device may runaway, for example, because values of a program and data read from a RAM in the electronic device become abnormal or an operation of a CPU in the electronic device becomes unstable, etc. Also, abnormal information may be stored in a recording medium, such as a flash memory and a disk.

(2) The flash memory, etc. is, for example, an EEPROM, so that the power supply has to be kept for a while to execute writing by receiving an instruction from the CPU as a control unit to save processing data, which has to be kept when turning off the power. If the power is not kept during the time, data inside the flash memory, etc. may be destroyed.

To prevent such disadvantages, even when the power is turned off, the power has to be supplied for a while until an operation of turning off the power is completed for performing a saving processing of the memory.

When turning off the power, to supply a voltage desired to be kept until operations of circuits, such as a memory and a CPU, in the electronic device, the countermeasures described below have been taken in the related art.

As shown in FIG. 1, by providing a capacitor 14 having a largish capacitance in a circuit composed of a power supply 11 of, for example, 5V, a constant voltage power supply 12 for outputting a constant voltage of, for example, 2.5V and a circuit unit 13, such as a flash memory, CPU and RAM, so that the capacitor 14 maintains the power supply voltage for a predetermined time required to backup processing even after turning off the power supply 11.

However, in this type of a power supply circuit, the capacitor 14 having a large-size capacitor, that is, a large capacitor has to be provided outside.

Comparing with the circuit configuration shown in FIG. 1, the circuit shown in FIG. 2 is provided with a power supply 15 having a larger current capacity instead of the power supply 11 and provided with a capacitor 14 having a large capacitance at the output side of the power supply 15.

However, in this type of a power supply circuit, the power supply 15 having a large current capacity has to be provided and, furthermore, the capacitor having a large capacitance, that is, a large capacitor has to be provided outside.

A circuit shown in FIG. 3 is provided with a B-system for backup in addition to an A-system composed of a power supply 11 of, for example, 5V, a constant voltage power supply 12 for outputting a constant voltage of, for example, 2.5V shown in FIG. 1. The B-system includes, for example, a second power supply 21 of 5V in a different system from that of the power supply 11, a second constant voltage power supply 22 for outputting a constant voltage of, for example, 2.5V, and a diode 23 for preventing a reverse current flow. Preferably, a Schottky barrier diode having a characteristic of a low voltage drop is used as the reverse flow preventing diode 23.

Normally, the circuit unit 13 such as a flash memory, a CPU and a RAM, etc. is supplied with a voltage of, for example, 2.5V from the first constant voltage power supply 12 in the A-system. A voltage of, for example, 2.5V is also supplied from the second constant voltage power supply 22 in the same way as the first constant voltage power supply 12, but the voltage from the second constant voltage power supply 22 becomes lower than the voltage from the first constant voltage power supply 12 due to a voltage drop (falls) in the reverse flow preventing diode 23, so that power is not supplied from the second constant voltage power supply 22 to the circuit unit 13. Also, a voltage in the A-system is not supplied to the B-system because of the reverse flow preventing diode 23.

When the first power supply 11 is turned off, an output voltage of the first constant voltage power supply 12 is lowered to 0. Since the voltage of the power supply in the B-system is normal, the circuit unit 13 such as a flash memory, CPU and RAM, etc. is supplied with a voltage from a power supply circuit in the B-system, that is, the second power supply 21 and the second constant voltage power supply 22 through the reverse flow preventing diode 23.

Even when using the Schottky barrier diode, showing a low voltage drop as the reverse flow preventing diode 23, however, the forward voltage drops, for example, by 0.4V or so, so that a voltage applied to the circuit unit 13 such as the flash memory, CPU and RAM, etc. becomes 2.1V or so even if a voltage of 2.5V is output from the second constant voltage power supply 22. This voltage is lower by about 20% than the drive voltage of the circuit unit 13 such as the a flush memory, CPU and RAM, etc. operating at a rated voltage of 2.5V, consequently, operations of the circuit unit 13 such as the flash memory, CPU and RAM, etc. may be adversely affected.

To overcome the disadvantages above, the raise of output voltages of the second power supply 21 and the second constant voltage power supply 22 may be considered. However, the reverse flow preventing diode 23 flows a current in a forward direction when a power supply voltage in the B-system is raised, and there is a possibility that power is supplied from the power supply in the B-system to the circuit unit 13 such as the flash memory, CPU and RAM, etc. even in a normal state, so that the power supply circuit may be adversely affected in terms of a current capacity, etc., systematically as the power supply in some cases.

The forward voltage of the diode changes due to a temperature and the characteristics vary due to an element, and thus an unfavorable result has been brought in a low voltage range in some cases.

From the above viewpoint, a memory and a CPU to be used are often operated by relying on a capable performance of being operational even at a low voltage at the time of saving.

Particularly in a flash memory, stored data may become unreadable or destroyed if an operation in the flash memory continues when the CPU normally starts a shut down operation.

FIG. 4 is a view of the configuration of another power supply circuit of the related art.

The power supply circuit shown in FIG. 4 includes an alternating power supply AC of a commercial frequency, for supplying a power to the circuit unit 13 such as a flash memory, CPU and RAM, etc., a power supply switch 32, a first rectifier circuit 10, a DC-DC converter 11, a first constant voltage circuit 12, a standby (backup) transformer 20, a second rectifier circuit 21, a second constant voltage circuit 22 and a reverse flow preventing diode 23.

When comparing the power supply circuit shown in FIG. 4 with that shown in FIG. 3, the power supply switch 32, the first rectifier circuit 10, the DC-DC converter 11 and the first constant voltage circuit 12 are included as a power supply circuit in the A-system; and the circuit illustrated as the first power supply 11 in FIG. 3 is configured by the power supply switch 32, the first rectifier circuit 10 and the DC-DC converter 11 in FIG. 4. Also, the power supply circuit in the B-system is configured by the standby transformer 20, the second rectifier circuit 21, the second constant voltage circuit 22 and the reverse flow preventing diode 23; and the circuit illustrated as the second power supply 21 in FIG. 3 is configured by the standby transformer 20, the second rectifier circuit 21.

In the power supply voltage shown in FIG. 4, in a normal operation, the power supply switch 32 is in a turned-on state, and power is supplied to the circuit unit 13 from the A-system power supply circuit including the first rectifier circuit 10, DC-DC converter 11 and first constant voltage circuit 12. In this state, the B-system power supply circuit, that is, the standby transformer 20, the second rectifier circuit 21 and the second constant voltage circuit 22 are also in operation, but power is not supplied from the power supply circuit in the B-system to the circuit unit 13 due to a voltage drop in the reverse flow preventing diode 23.

For example, when the power supply switch 32 is turned off (an open state), power supply from the A-system circuit to the circuit unit 13 is suspended. However, since the power supply circuit in the B-system is in operation, power is supplied from the B-system power supply circuit to the circuit unit 13 without any discontinuity.

The operation of the power supply circuit in FIG. 4 explained above is the same as that of the power supply circuit explained with reference to FIG. 3.

In the same way as the first constant voltage circuit 12 and the second constant voltage circuit 22 shown in FIG. 3, when assuming that a constant voltage of 2.5V is output from the first constant voltage circuit 12 and the second constant voltage circuit 22 shown in FIG. 4, at the time of supplying power from the B-system power supply circuit to the circuit unit 13, a lack of a voltage to the circuit 13 due to a voltage drop in the reverse flow preventing diode 23 explained above becomes disadvantageous.

On the other hand, when an output voltage of the second constant voltage circuit 22 is raised to improve the voltage shortage, the disadvantageous effects explained above are caused.

The Japanese Unexamined Patent Publication No. 11-175203 discloses a technique of saving data not by using a backup power supply, etc. but by using power generated by using an inertial force of a rotating recording medium.

SUMMARY OF THE INVENTION

The method disclosed in the above patent publication is limited to be applied to an apparatus including a rotating recording medium, and a power generating circuit has to be provided.

Therefore, it is desired to overcome the above disadvantages by providing a power supply circuit, by which a power supply of a backup (standby) system can be operational effectively even when a normal power supply used at a normal operation is cut off.

Also, an electronic device to be supplied with power from the power supply circuit is provided according to the present invention.

According to a first aspect of the present invention, there is provided a power supply circuit for supplying power to a circuit unit, including a first power supply system for supplying a first voltage to the circuit unit at a normal operation; and a second power supply system for supplying the first voltage to the circuit unit when the first voltage cannot be supplied by the first power supply system; wherein the second power supply system includes a first power supply for outputting a second voltage, a regulator supplied with power from the first power supply, a reverse flow preventing diode provided between an output portion of the regulator and the circuit unit, and a feedback circuit for detecting a voltage to be applied to the circuit unit and feeding back the detected voltage to the regulator; and the regulator adjusts an output voltage thereof, so that a voltage to be applied to the circuit unit for a predetermined time after the first power supply system becomes unable to supply the first voltage becomes approximately the first voltage.

According to a second aspect of the present invention, there is provided a power supply circuit for supplying a direct current voltage generated based on an alternating voltage to be supplied via a power supply switch, including a first power supply system for supplying a first voltage to a first circuit unit; and a second power supply system for supplying a higher second voltage than the first voltage to a second circuit unit giving a lighter load comparing with a load by the first circuit unit; wherein the second power supply system includes a regulator supplied with power from the second power supply; a reverse flow preventing diode provided between an output portion of the regulator and the first circuit unit; and a feedback circuit for detecting a voltage to be applied to the first circuit unit and feeding back the detected voltage to the regulator; wherein the regulator adjusts an output voltage thereof based on the voltage detected by the feedback circuit, so that a voltage to be applied to the first circuit unit for a predetermined time after the power supply switch is turned off becomes approximately the first voltage.

Preferably, the feedback circuit includes a pair of serially connected first and second resistors connected to both ends of the reverse flow preventing diode, and a pair of serially connected third and fourth resistors connected to connection portions of the first and second resistors; and the connection portions of the third and fourth resistors are connected to a returned signal input terminal of the regulator.

According to a third aspect of the present invention, there is provided an electronic device including the power supply circuit explained above including a power supply switch for controlling supply of an alternating power supply by being turned on or off; and a memory as the first circuit unit, and a control circuit for controlling the memory; wherein the control circuit performs saving processing of data of the memory by being supplied with power from the second power supply system when the power supply switch is turned off.

In the power supply circuit of the present invention, with respect to a reverse flow from a power supply circuit in a first system to a power supply circuit in the second system, on a voltage to be applied to both ends of a reverse flow preventing diode, since a voltage of the power supply circuit in the second system can be set lower than a voltage of the power supply circuit in the first system from the beginning, the voltage of the power supply circuit in the second system does not become higher than the voltage of the power supply circuit in the first system and abnormal supply of a current can be prevented. Even if a current flows through the reverse flow preventing diode and varies to a certain extent due to a forward voltage drop of the reverse flow preventing diode when the power supply circuit in the first system actually operates abnormally, the voltage drop is fed back and an output voltage of a regulator is suitably adjusted (raised) automatically, consequently, a voltage desired to be supplied until a completion of the circuit operation can be generated stably.

Furthermore, according to the power supply circuit of the present invention, a necessary voltage can be maintained stably for a power supply of a flash memory, a RAM and a CPU, etc., which requires management of a falling timing of the circuit voltage, from arise of a state of finishing the operation, such as reset, until actual finish of the operation of each part.

The electronic device of the present invention operates by power supplied from the above power supply circuit, so that it can operate normally even when the power supply circuit in the first system becomes unable to operate normally.

BRIEF DESCRIPTION OF DRAWINGS

These and other objects and features of the present invention will become clearer from the following description of the preferred embodiments given with reference to the attached drawings, in which.

DESCRIPTION OF THE PREFERRED EMBODIMENT

First Embodiment

Figure 5:
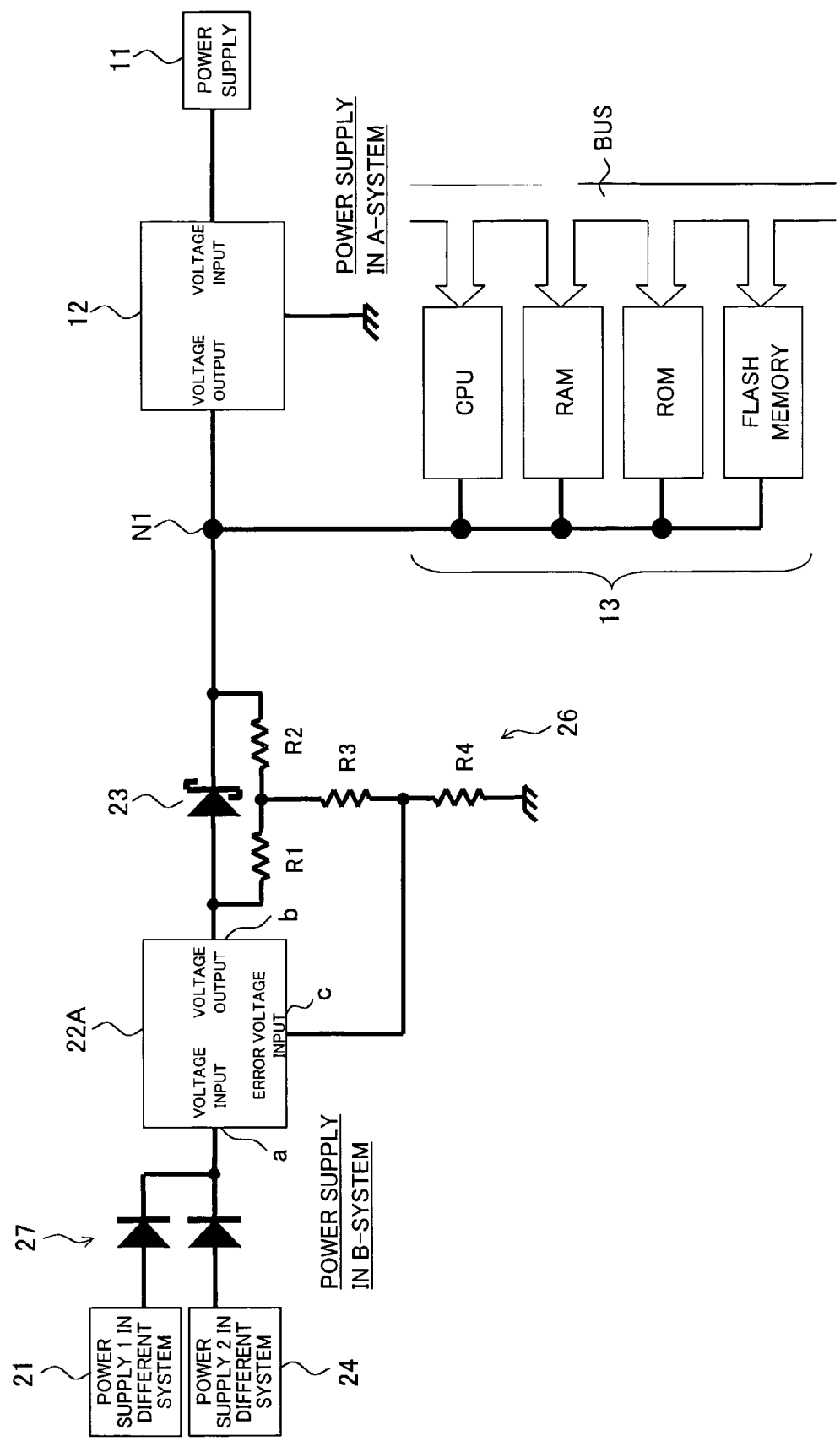
FIG. 5 is a view of the configuration of a power supply circuit of an embodiment of the present invention.

A circuit configuration of a first embodiment of the present invention is shown in FIG. 5.

FIG. 5 shows a power supply circuit and a circuit unit supplied with power from the power supply circuit in an electronic equipment.

In the circuit shown in FIG. 5, a first power supply 11 for outputting a voltage of, for example, 5V and a first constant voltage power supply 12 for supplying a constant voltage of, for example, 2.5V to the circuit unit 13 such as a flash memory, a CPU and a RAM, etc. in an A(first)-system used for a normal operation are the same as those explained with reference to FIG. 3 and FIG. 4. Note that the CPU as a control unit of the electronic equipment controls the entire equipment by following a program stored in a ROM connected via a bus. The RAM is used as a working area at this time. The flash memory stores, for example, setting by a user.

Figure 1:
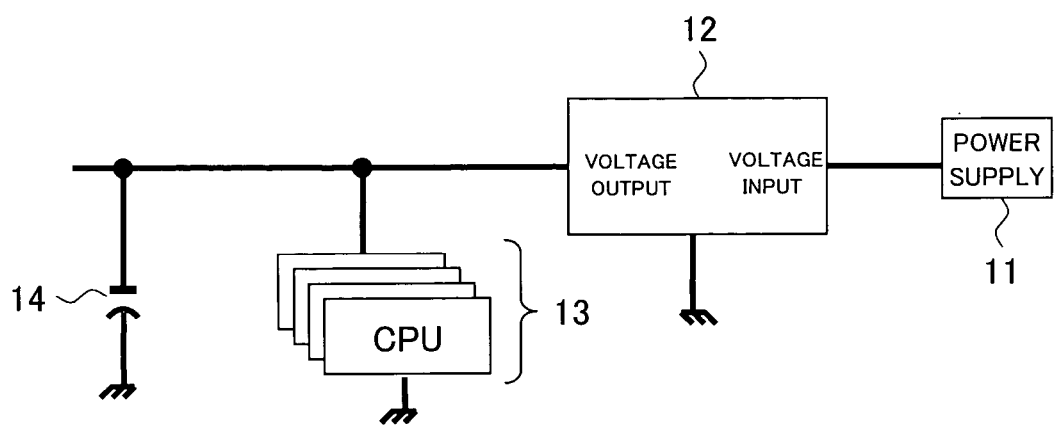
FIG. 1 is a view of the configuration of a first power supply circuit of the related art.
Figure 2:
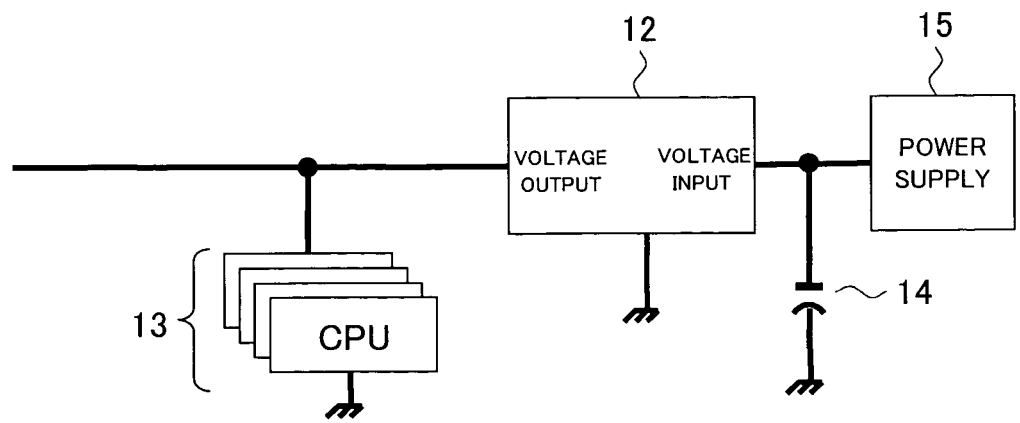
FIG. 2 is a view of the configuration of a second power supply circuit of the related art.
Figure 3:
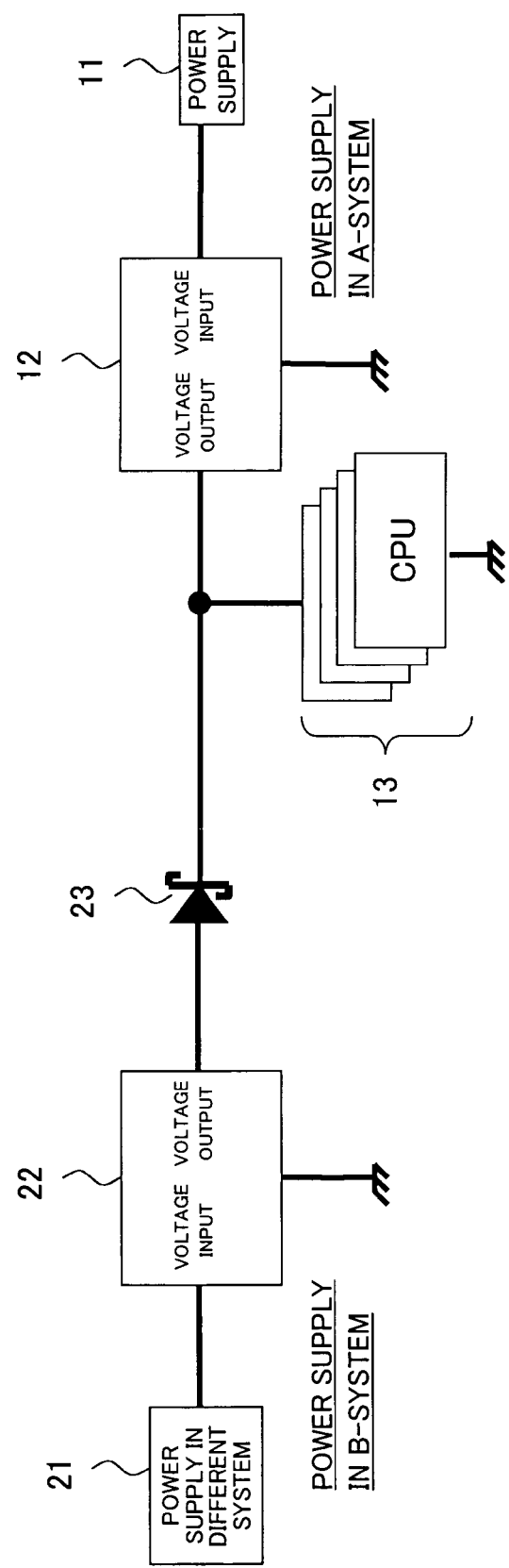
FIG. 3 is a view of the configuration of a third power supply circuit of the related art.
Figure 4:
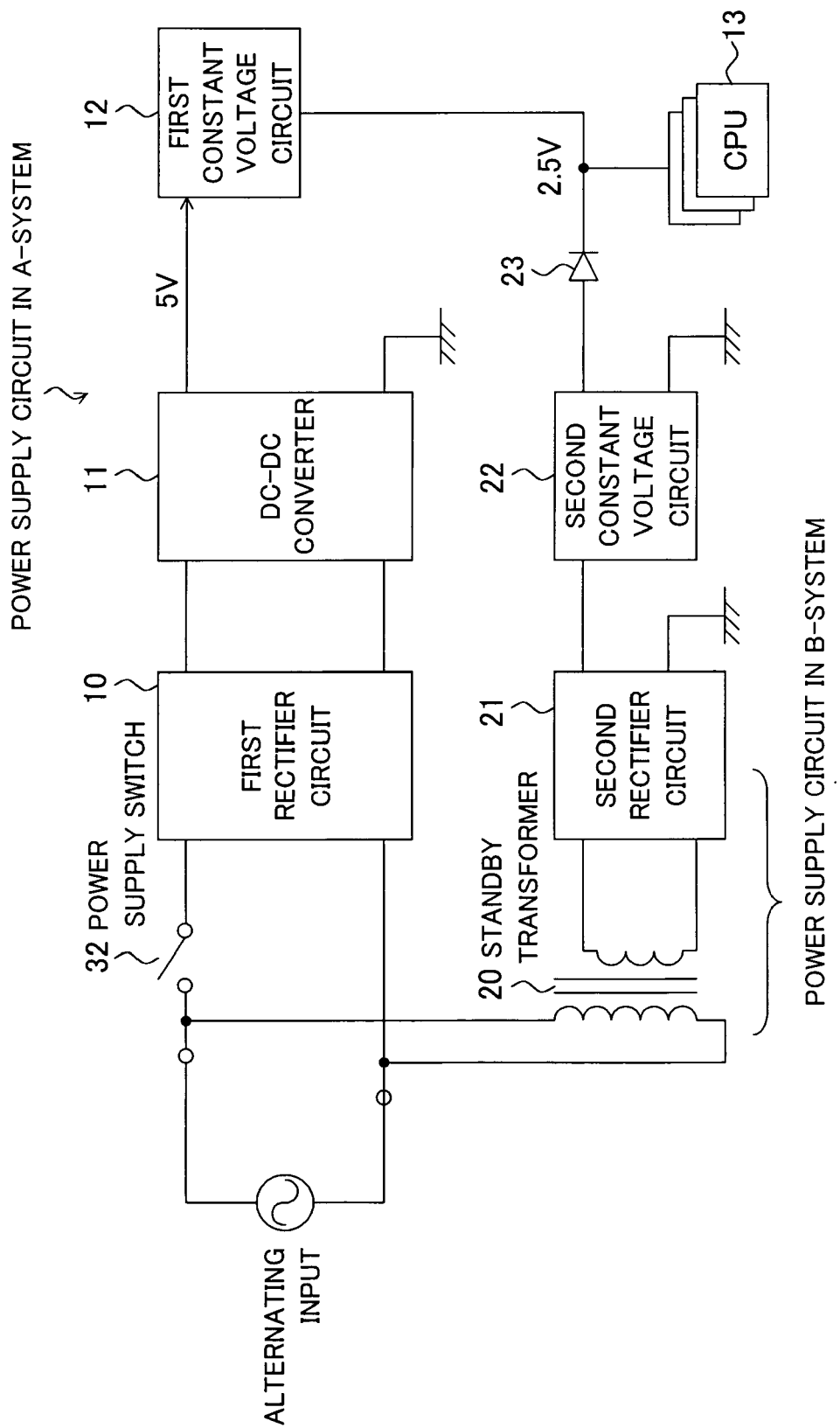
FIG. 4 is a view of the configuration of another power supply circuit of the related art.

In a power supply circuit in a B(second)-system (backup system) shown in FIG. 5, an error voltage (returned signal) input terminal "c" for receiving an error voltage as a returned signal is provided instead of the second constant voltage power supply 22 shown in FIG. 3 and FIG. 4, and a variable output regulator 22A for outputting a predetermined voltage from an output terminal "b" in accordance with the error voltage (returned signal) input from an input terminal "a" is used.

Also, to monitor a voltage applied to the circuit unit 13 such as the flash memory, CPU and RAM, etc. (to monitor a voltage at a voltage supply point N1), the power supply circuit in the B-system shown in FIG. 5 is provided with a feedback circuit 26 configured as a resistance network circuit including resistors R1 to R4 for monitoring terminal voltages of the reverse flow preventing diode 23, detecting the terminal voltages of the reverse flow preventing diode 23, and feeding back the detected voltages to the error voltage input terminal "c", of the regulator 22A.

Furthermore, the power supply circuit in the B-system shown in FIG. 5 may be preferably provided with a second power supply 24 in a different system for outputting a voltage of, for example, 8V to improve reliability at backup in addition to the first power supply 21 in the different system for outputting a voltage of, for example, 5V. The second power supply 24 is not always necessary, of course, but when the second power supply 24 is provided, reliability is also improved in the case where the first power supply 11 is turned off or in a not operating state and, furthermore, the first power supply 21 in the different system is turned off or not operating.

Furthermore, when the second power supply 24 for outputting a higher voltage than that of the first power supply 21 in the different system is provided in addition to the first power supply 21 in the different system, the regulator 22A outputs a voltage in accordance with the voltage of the second power supply 24 outputting a higher voltage than that of the first power supply 21.

When the second power supply 24 is provided in addition to the first power supply 21 in the different system, a reverse flow preventing diode circuit 27 is provided. The reverse flow preventing diode circuit 27 is not necessary when only the first power supply 21 in the different system is used.

A role of the reverse flow preventing diode 23 for preventing a current leakage from the power supply in the A-system to the power supply circuit in the B-system at a normal operation is the same as that of the circuit shown in FIG. 3 and FIG. 4 and, for example, a Schottky barrier diode, wherein a breakdown voltage is low and a voltage drop (fall) is a little, is preferable.

The regulator 22A outputs a voltage of, for example, 2.5V regulated as a voltage for the circuit unit 13 such as the flash memory, CPU and RAM, etc. even when a voltage of 5V is input from the first power supply 21 in the different system for outputting a voltage of, for example, 5V or when a voltage of 8V is input from the second power supply 24 in the different system for outputting a voltage of, for example, 8V. Note that the regulator 22A is configured to be able to adjust a output voltage thereof in accordance with an error voltage fed back from the feedback circuit 26 of the resistance network circuit including the resistors R1 to R4 to the error voltage input terminal "c".

The regulator 22A operating as above is, for example, a series regulator.

A current during finishing processing of the circuit unit 13 such as the flash memory, CPU and RAM, etc. is normally 1A or smaller, for example, 100 mA or so in the case of a flash memory. The regulator 22A supplies the current to the circuit unit 13 such as the flash memory, CPU and RAM, etc. at a backup operation.

In the power supply circuit in FIG. 5, voltages from both ends of the reverse flow preventing diode 23 divided by the series resistors R1 and R2 are furthermore divided by a resistor circuit of the series resistors R3 and R4, and the divided voltage is input (fed back) as an error voltage (returned signal) to the error voltage input terminal "c" of the regulator 22A.

At a normal operation, values of the four resistors R1 to R4 are determined, so that a voltage in the B-system becomes a little lower than a voltage of the A-system.

Resistance values of the resistors R1 and R2 are set to be values for determining to what degree a voltage of the reverse flow preventing diode 23, preferably, a Schottky diode is fed back to the regulator 22A. General resistance values of the resistors R1 and R2 are several tens of Ω or so, and a preferable ratio of resistance values of the resistors R1 and R2 is 5:1 or so. When the ratio is small, a voltage drop in the regulator 22A becomes large when a feedback is given to the regulator 22A. On the other hand, when the ratio is large, frequency of supplying a current from the circuit in the B-system may become high when a voltage in the A-system changes during a normal operation.

Note that the resistors R3 and R4 have resistance of an order of several kilos of Ω, which determines a voltage of the B-system together with low resistance values of the resistors R3 and R4. When the power supply circuit in the A-system is in operation and the circuit in the B-system is not in operation (normal operation), the load becomes light, while the load on the circuit in the B-system becomes heavy in a backup operation; so that the power supply circuit in the B-system is preferably provided with a capacitor (not shown) for preventing an oscillation.

When power is supplied normally from the power supply circuit in the A-system to the circuit unit 13 such as the flash memory, CPU and RAM, etc., a voltage of the power supply circuit in the B-system is set a little lower than a voltage in the A-system, that is, a voltage of the power supply circuit in the A-system becomes higher than that of the power supply circuit in the B-system. To put it another way, a current does not flow from the power supply circuit in the A-system to the power supply circuit in the B-system due to the reverse flow preventing diode 23, so that the disadvantages explained above with reference to FIG. 3 and FIG. 4 are overcome.

When a voltage of the power supply circuit in the A-system declines, for example, as a result that the first power supply 11 is turned off, etc., a voltage of the power supply circuit in the B-system becomes higher, so that a current is supplied from the power supply circuit in the B-system to the circuit unit 13 such as the flash memory, CPU and RAM, etc. via the reverse flow preventing diode 23. At this time, the voltage to be supplied to the circuit unit 13 such as the flash memory, CPU and RAM, etc. drops (falls) exactly by a drop amount of a forward voltage in the reverse flow preventing diode 23, but it is detected by the feedback circuit 26 and input to the error voltage input terminal "c" of the regulator 22A for feeding back to the regulator 22A. In this way, it is possible to detect a voltage change at the voltage supply point N1 to the circuit unit 13 such as the flash memory, CPU and RAM, etc. in the circuit shown in FIG. 5. The regulator 22A raises the output voltage to compensate the voltage drop amount in the diode 23 in accordance with the detected voltage, so that the voltage at the voltage supply point N1 becomes a regulated voltage. As a result, the voltage at the voltage supply point N1 becomes the same as a voltage at the time of supplying power from the power supply circuit in the A-system in a normal operation.

As explained above, the circuit in FIG. 5 overcomes the disadvantages of the circuits shown in FIG. 3 and FIG. 4.

Figure 6:
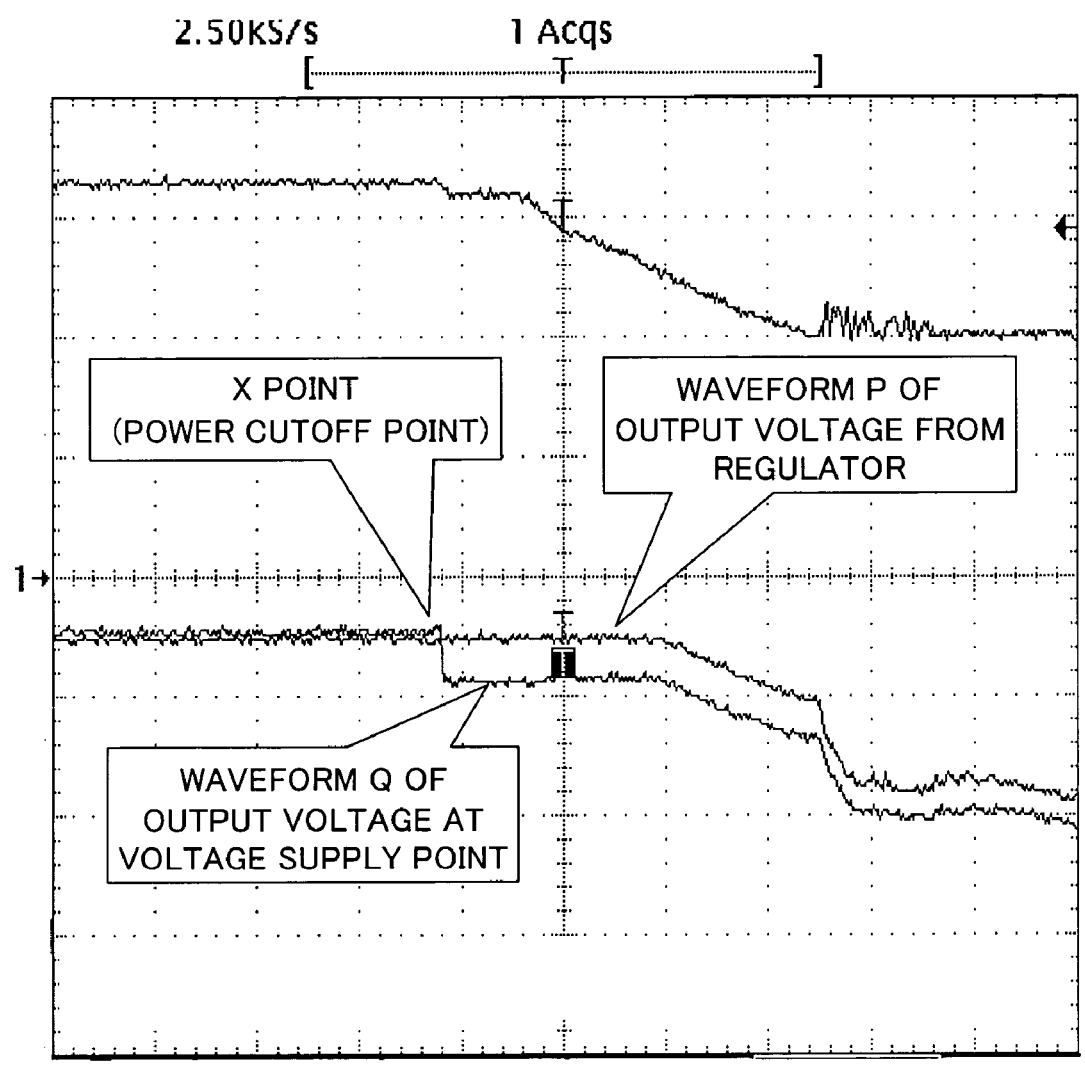
FIG. 6 is a view showing operating characteristics of the power supply circuit shown in FIG. 4.
Figure 7:
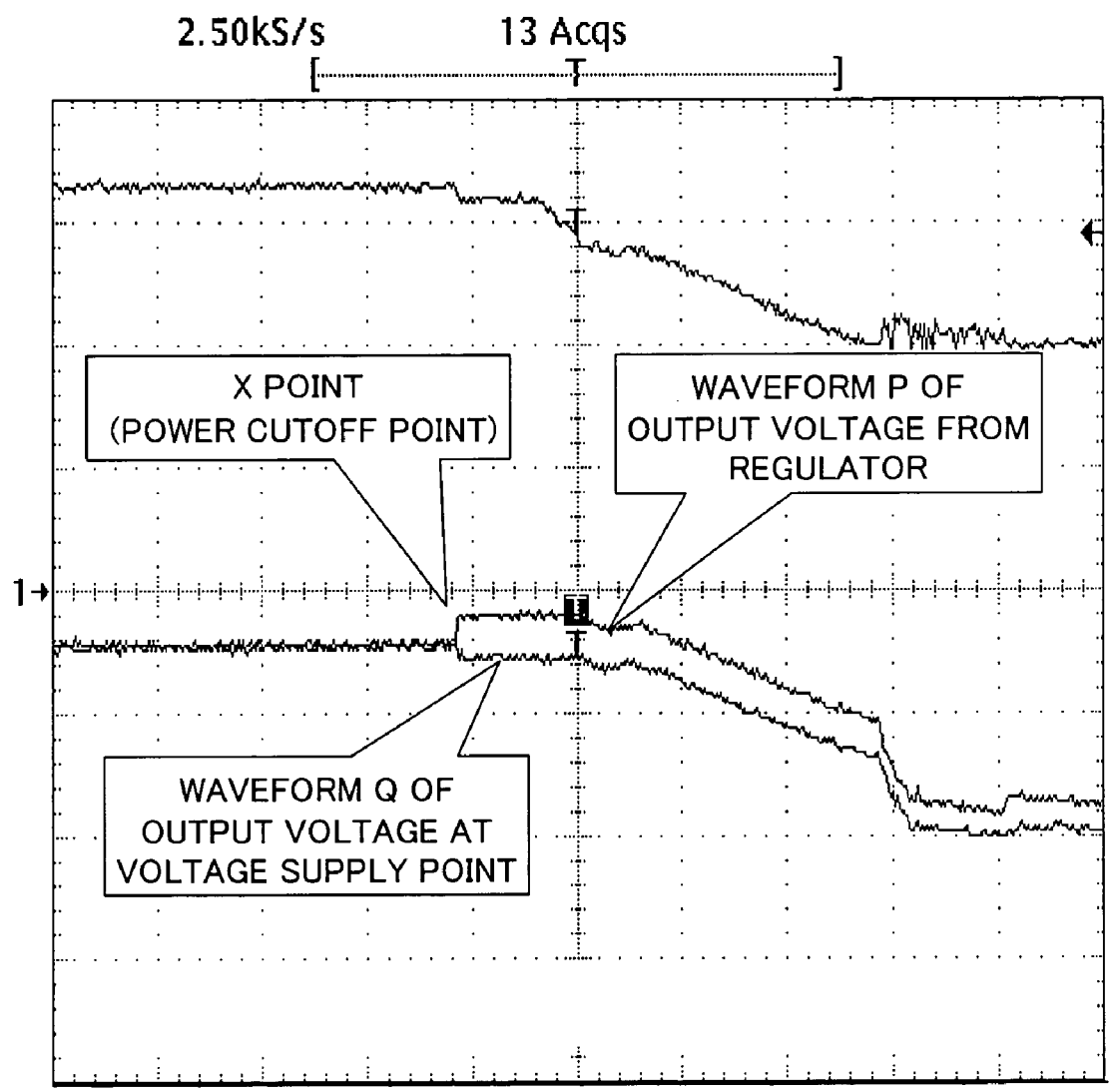
FIG. 7 is a view showing operating characteristics of the power supply circuit shown in FIG. 5.

FIG. 6 is a view of operating characteristics of the circuit shown in FIG. 3 and FIG. 4 as a comparative example. FIG. 7 is a view of operation characteristics of the circuit shown in FIG. 5.

When comparing the characteristics in FIG. 6 with those in FIG. 7, when a potential of the voltage supply point N1 drops by turning off the first power supply 11, etc., a voltage of the power supply circuit in the B-system becomes higher exactly by the voltage drop amount in the reverse flow preventing diode 23 in FIG. 7. On the other hand, in FIG. 6, when a potential of the voltage supply point N1 drops by turning off the first power supply 11, etc., the voltage of the power supply circuit in the B-system does not change.

As explained above, in the circuit in FIG. 5, when using the reverse flow preventing diode 23, if the forward voltage drops, for example, by 0.4V or so, the voltage drop is detected by the feedback circuit 26 of the resistance network circuit including the resistors R1 to R4 and input as a feedback voltage to the regulator 22A. As a result, the regulator 22A compensates the voltage drop amount in the reverse flow preventing diode 23 by outputting a voltage of, for example, 2.8V or so and instantly corrects the voltage drop in the reverse flow preventing diode 23, so that a voltage of about 2.4V can be supplied to the circuit unit 13 such as the flash memory, CPU and RAM, etc. in the same way as in the case of supplying from the power supply circuit in the A-system in a normal operation.

According to the embodiment of the present invention, the effects below can be obtained.

(1) A voltage of the power supply circuit in the B-system can be set lower than a voltage of the power supply circuit in the A-system from the beginning, so that the voltage of the power supply circuit in the B-system does not become higher than the voltage of the power supply circuit in the A-system. Therefore, abnormal supply of a current from the power supply circuit in the A-system to the power supply circuit in the B-system is not caused. Furthermore, for example, a reverse flow from the A-system to the B-system can be also prevented by the reverse flow preventing diode 23.

(2) When the power supply circuit in the A-system is turned off, power is supplied from the regulator 22A to the circuit unit 13 through the diode 23. At this time, although a voltage drops in the diode 23, a voltage at the voltage supply point N1 can be maintained at a regulated voltage by feedback by the feedback circuit 26.

(3) As a result, a voltage desired to be maintained until completion of an operation of the circuit can be generated stably.

According to the present embodiment, it is possible to maintain a necessary voltage stably for a power supply of a flash memory, RAM and CPU, etc., which requires management of a voltage lowering timing, from arising of a state of finishing operation, such as reset, until operations in respective parts actually finish.

Second Embodiment

Figure 8:
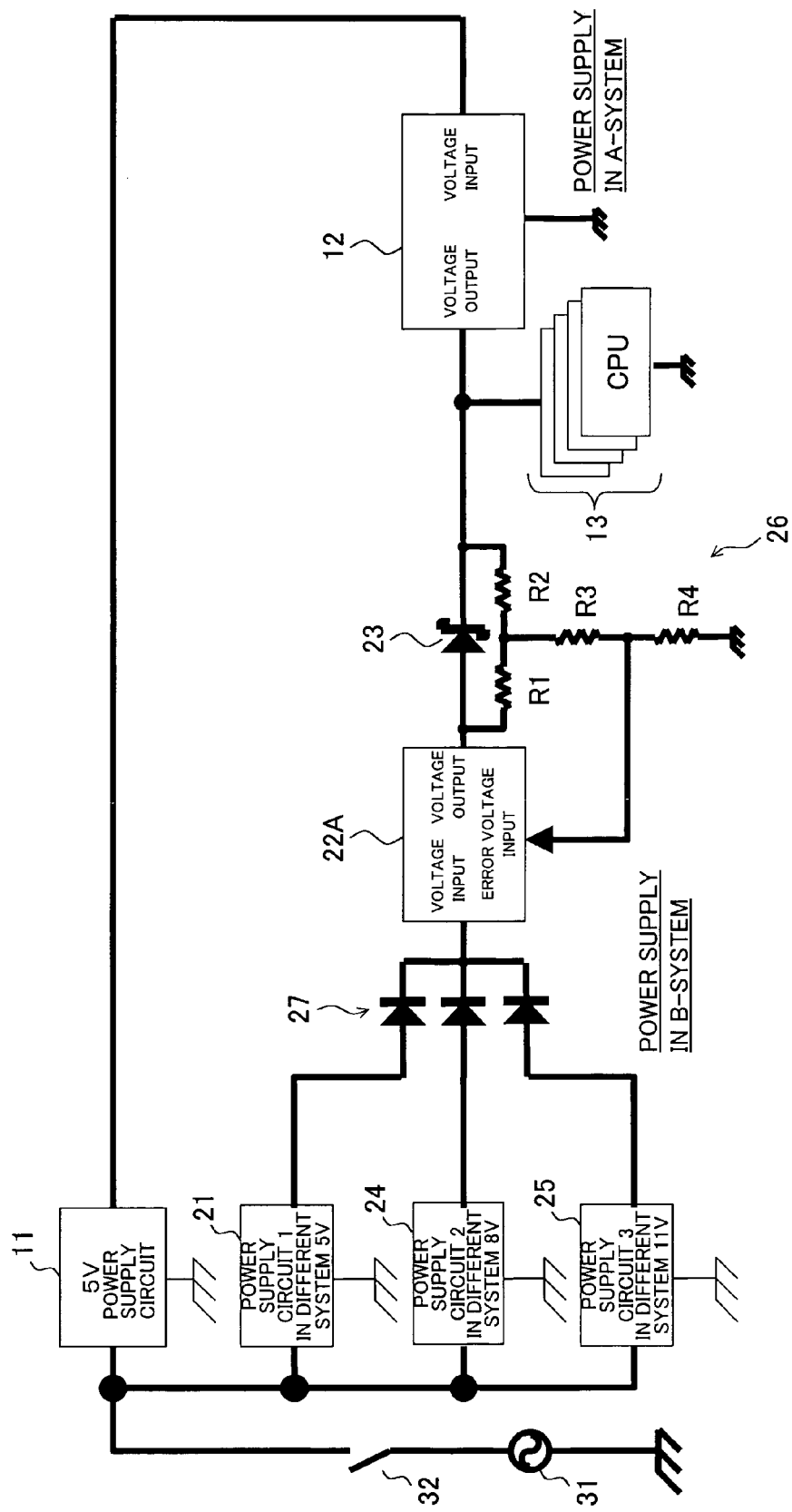
FIG. 8 is a view of the configuration of a power supply circuit of a second embodiment of the present invention.

FIG. 8 shows the circuit configuration of a second embodiment of the power supply circuit of the present invention.

In the power supply circuit shown in FIG. 8, backup is assured by adding a first power supply 21 in a different system for outputting a voltage of, for example, 5V in addition to the first power supply 11 for outputting a voltage of, for example, 5V and adding a third power supply 25 for outputting a voltage of, for example, 11V in addition to the second power supply 24 for outputting a voltage of, for example, 8V. Along with the addition of the third power supply 25, one reverse flow preventing diode is also added in the diode circuit 27.

Since the first power supply 11 is imposed the heaviest load, falling of the voltage is the fastest when the power supply switch 32 is turned off. Comparing with that, those with a light load and slow voltage falling are selected as the first power supply 21, the second power supply 22 and the third power supply 25 in the different system.

As explained above, when provided with the first power supply 21, the second power supply 22 and the third power supply 25 in the different system, the regulator 22A operates in accordance with a voltage supplied from the power supply having the highest voltage among them when the power supply switch 32 is turned off (open).

For example, in the case of a television set, when there is a power supply provided with an electrolytic capacitor with a high voltage and high capacity, such as a power supply of an LNB (parabola antenna), it can be used as the third power supply 25, for example.

For example, when power is supplied form the third power supply 25 of, for example, 11V, the regulator 22A takes time in an order of several seconds until the voltage falls to 5V. Therefore, it is preferable to provide a circuit for preventing (blocking) the backup circuit at the time of a normal operation and restoring.

The first power supply 11 and the first to third power supplies 21, 24 and 25 in the different system are supplied with power from a common commercial power supply 31 via the power supply switch 32.

Figure 9:
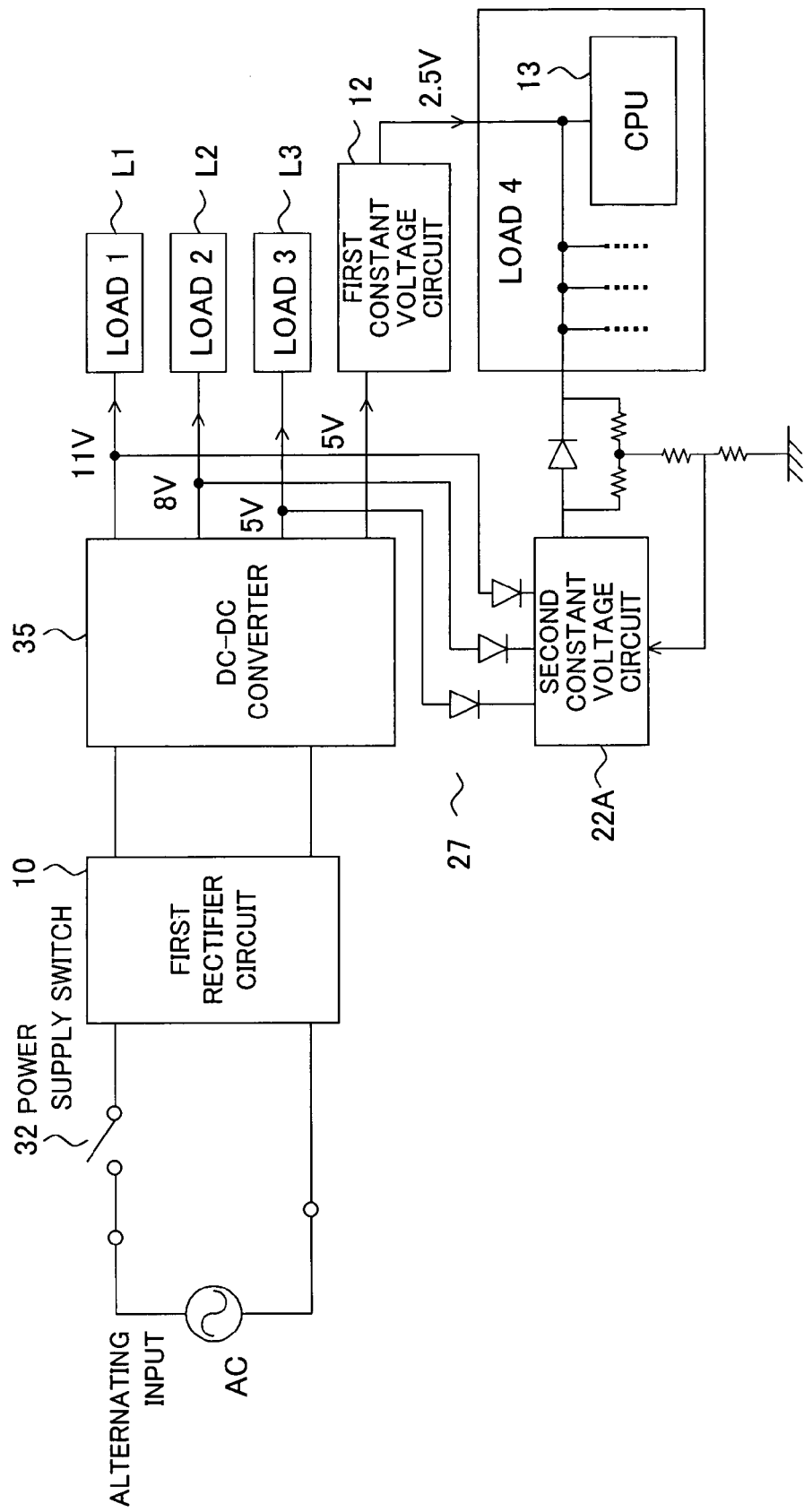
FIG. 9 is a view of the configuration of a modified embodiment of the power supply circuit of the second embodiment of the present invention.

FIG. 9 is a view of the configuration of a power supply circuit of a modified embodiment of the power supply circuit shown in FIG. 8. To supply power to the circuit unit 13 and a plurality of loads 1 to 3, the power supply circuit shown in FIG. 8 includes an alternating power supply AC of a commercial frequency, a power supply switch 32, a rectifier circuit 10, a DC-DC converter 35, a first constant voltage circuit 12, a reverse flow preventing diode circuit 27, a regulator 22A as a second constant voltage circuit, a diode 23 and a feedback circuit 26.

The DC-DC converter 35 outputs voltages of 5V, 8V and 11V required by the plurality of loads L1 to L3. Two 5V voltages are output because 5V voltages are in demand. The load L1 is, for example, an LNB, the load L2 is an audio amplifier, the load L3 is a front-end portion including a tuner, and a load L4 includes a CPU, flash memory, RAM and digital signal processing circuit and is the heaviest load.

To supply power to the circuit unit 13, 5V from the DC-DC converter 35 is supplied to the first constant voltage circuit 12 and a voltage of 2.5V is supplied from the first constant voltage circuit 12 to the circuit unit 13.

The regulator 22A as a part of a backup power supply circuit is applied with three kinds of voltages, 5V, 8V and 11V via the reverse flow preventing diode circuit 27. In accordance with any one of the voltages, the regulator 22A outputs a voltage of 2.5V to the diode 23 in the same way as the first constant voltage circuit 12. Terminal voltages of the diode 23 are returned to the regulator 22A.

Note that when the power supply switch 32 is turned off, both of an output of the first constant voltage circuit 12 and an output of the regulator 22A are lost, however, even though the first constant voltage circuit 12 operational only by a heavy load of 5V is turned off, the regulator 22A operational by a light load of 11V, etc. continues to operate for a while, so that saving processing of a memory, etc. can be performed during the time.

A variety of modifications other than the above may be made when embodying the power supply circuit of the present invention.

According to the embodiments of the present invention, a power supply circuit for supplying a voltage desired to be maintained, for example, until completion of an operation of a certain circuit in an electronic device when the power supply is turned off in the electronic device, such as a digital equipment, is provided.

Particularly, by using other usable voltage, a stable voltage can be instantly supplied by automatically switching the voltage with a very small voltage change for power supplies of a flash memory, RAM and CPU, etc., which requires management of a falling timing of the power supply voltage.

The present invention is particularly effective as a power supply of a flash memory, RAM and CPU, etc., which requires management of a falling timing of a circuit voltage to be used, in a circuit using a plurality of power supplies.

Furthermore, the power supply circuit of the embodiments of the present invention can be easily added to an existing power supply circuit, so that it can be an effective countermeasure to a drop of a power supply voltage, etc.

Note that the present invention is not limited to the configurations in the embodiments explained above. For example, an example of saving processing data in the flash memory or RAM of the digital equipment was explained in the embodiments, but the present invention may be widely applied also to the case of saving data in an external recording medium, such as a memory card inserted into a slot.

It should be understood by those skilled in the art that various modifications, combinations, sub-combinations and alternations may occur depending on design requirements and other factors insofar as they are within the scope of the appended claims or the equivalents thereof.

What is claimed is:

1. A power supply circuit for supplying power to a circuit unit, comprising:
   a first power supply system for supplying a first voltage to said circuit unit at a normal operation; and
   a second power supply system for supplying said first voltage to said circuit unit when said first voltage cannot be supplied by said first power supply system, said second power supply system including
      a first power supply for outputting a second voltage,
      a regulator supplied with power from the first power supply,
      a reverse flow preventing diode arranged between an output portion of the regulator and said circuit unit, and
      a feedback circuit for detecting a voltage to be applied to said circuit unit between both ends of said reverse flow preventing diode and feeding back the detected voltage to said regulator, and
   said regulator adjusting an output voltage thereof, so that a voltage to be applied to said circuit unit for a predetermined time after said first power supply system becomes unable to supply said first voltage, said voltage to be applied to said circuit unit becomes lower with respect to said first voltage.

2. A power supply circuit for supplying a direct current voltage generated based on an alternating voltage to be supplied via a power supply switch, comprising:
   a first power supply system for supplying a first voltage to a first circuit unit; and a second power supply system for supplying a higher second voltage than said first voltage to a second circuit unit giving a lighter load comparing with a load by said first circuit unit,
   said second power supply system including
   a regulator supplied with power from said second power supply;
   a reverse flow preventing diode arranged between an output portion of the regulator and said first circuit unit; and
   a feedback circuit for detecting a voltage to be applied to said first circuit unit between both ends of said reverse flow preventing diode and feeding back the detected voltage to said regulator, and said regulator adjusting an output voltage thereof based on the voltage detected by said feedback circuit, so that a voltage to be applied to said first circuit unit for a predetermined time after said power supply switch is turned off, said voltage to be applied to said circuit unit becomes lower with respect to said first voltage.

3. A power supply circuit as set forth in claim 1 or 2, wherein:
   said feedback circuit comprises
      a pair of serially connected first and second resistors connected to both ends of said reverse flow preventing diode, and
      a pair of serially connected third and fourth resistors connected to connection portions of the first and second resistors; and
   the connection portions of said third and fourth resistors are connected to a returned signal input terminal of said regulator.

4. An electronic device, including the power supply circuit as set forth in claim 1 or 2, comprising:
   a power supply switch for controlling supply of an alternating power supply by being turned on or off; and
   a memory as said first circuit unit, and a control circuit for controlling the memory;
   said control circuit performing a saving processing of data of said memory by being supplied with power from said second power supply system when said power supply switch is turned off.

* * * * *